United States Patent

Santarnecchi

Patent Number: 6,155,062
Date of Patent: Dec. 5, 2000

[54] METHOD OF OPERATING AN AIR-CONDITIONING INSTALLATION OF A HELICOPTER CABIN OR COCKPIT

[75] Inventor: Joël Santarnecchi, Fontvieille, France

[73] Assignee: Eurocopter, France

[21] Appl. No.: 09/354,964

[22] Filed: Jul. 16, 1999

[30] Foreign Application Priority Data

Jul. 17, 1998 [FR] France .................................. 98 09142

[51] Int. Cl.[7] ................................................... F25B 39/04
[52] U.S. Cl. .......................... 62/181; 62/182; 62/228.4; 62/158; 62/230; 62/236
[58] Field of Search .............................. 62/180, 181, 182, 62/183, 184, 228.4, 157, 158, 231, 230, 236, 229, 228.1, 228.3

[56] References Cited

U.S. PATENT DOCUMENTS

| | | | |
|---|---|---|---|
| 4,622,827 | 11/1986 | Jabami et al. | 62/158 |
| 4,941,325 | 7/1990 | Nuding | 62/179 X |
| 5,058,390 | 10/1991 | Sindermann et al. | 62/181 |
| 5,572,879 | 11/1996 | Harrington et al. | 62/217 |
| 5,629,568 | 5/1997 | Mertens | 290/40 R |

FOREIGN PATENT DOCUMENTS 0 703 419 A2  3/1996  European Pat. Off. .

*Primary Examiner*—Harry B. Tanner
*Attorney, Agent, or Firm*—Piper, Marbury, Rudnick & Wolfe

[57] ABSTRACT

A mode of operation of an air-conditioning installation of a compression cycle type helicopter cabin or cockpit air-conditioning installation is characterized in that it includes a start-up sequence controlled by an inverter controlling the motor-compressor associated with a condenser equipped with a fan and during which the fan of the condenser is first powered up, after which the motor-compressor is powered up to start it at a low speed, after which the motor-compressor is operated under its normal conditions as a function of the cooling requirements of the installation. Other features concern the mode of powering the motor-compressor in accordance with various atmospheric and operating conditions.

9 Claims, 1 Drawing Sheet

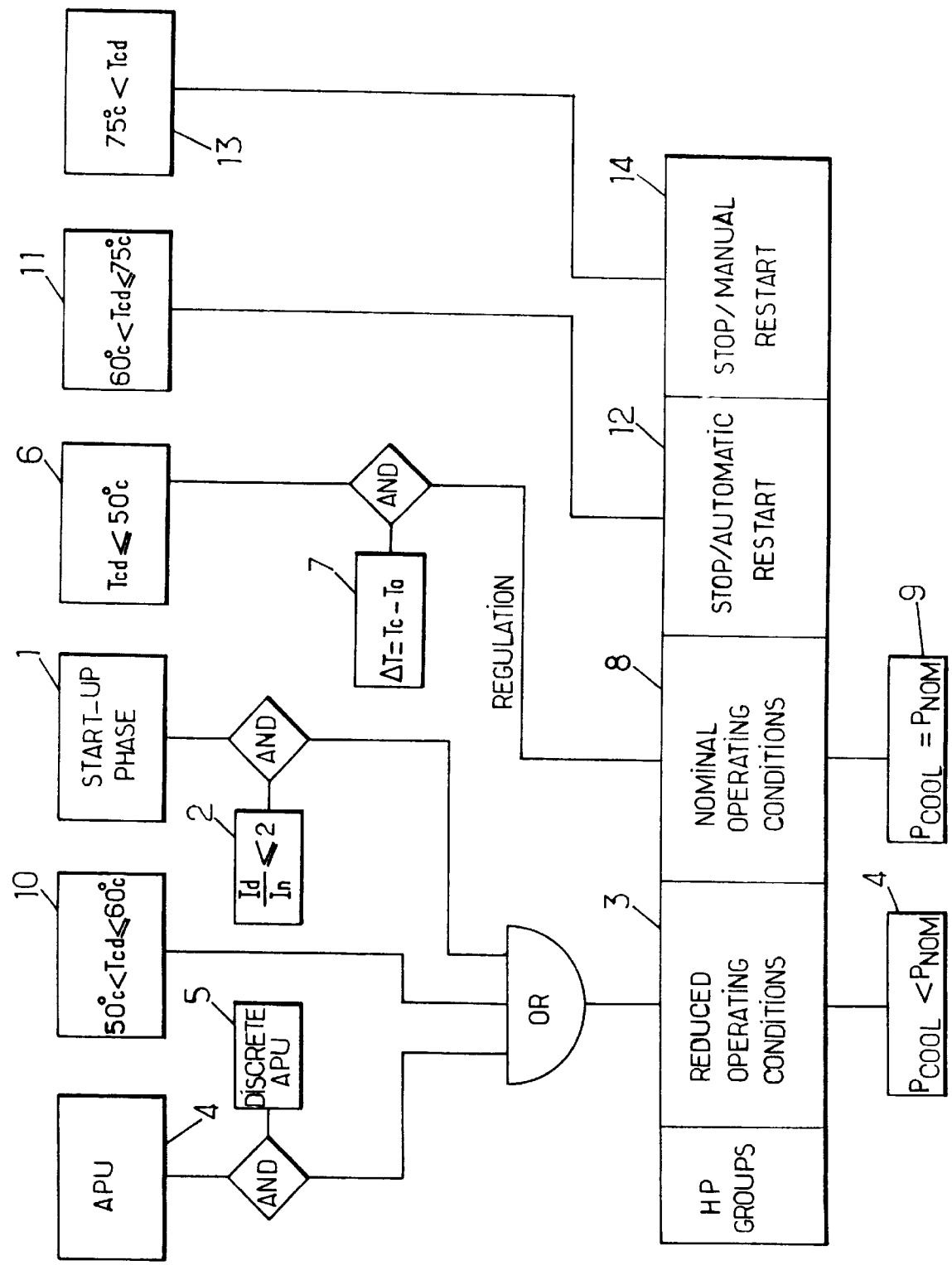

METHOD OF OPERATING AN AIR-CONDITIONING INSTALLATION OF A HELICOPTER CABIN OR COCKPIT

The present invention concerns a mode of operation of an air-conditioning installation of a helicopter cabin or cockpit, the helicopter being equipped with an auxiliary power unit adapted to deliver additional electrical power less than the electrical power of the main onboard alternator, which installation is of the type using cyclic compression and expansion of a coolant fluid and includes, by way of a external high-pressure unit, a storage tank for said fluid, and a motor-compressor powered by an electrical control system including a controller and an inverter for controlling the motor-compressor, the motor-compressor being associated with a condenser equipped with a fan and, by way of an internal low-pressure unit, an evaporator associated with an expansion unit, with air inlets and outlets communicating with said cabin or cockpit.

The aim of the invention is to establish an optimum mode of operation for the installation as a function of requirements of the occupants of the cabin or cockpit, external temperature conditions at the inlet of the condensers and the available electrical power, whether the helicopter is in flight or on the ground.

In accordance with a first feature of the invention, the above mode of operation is characterised in that it includes a start-up sequence controlled by said inverter during which the fan of the condenser is first powered up, after which the motor-compressor is powered up to start it at a low speed, after which the motor-compressor is operated under its normal conditions and as a function of the cooling requirements of the installation.

The figure shows the above function, and others referred to hereinafter, are shown in the functional block diagram. In the figure, the lozenges represent AND functions, the semicircle an OR function and the rectangles represent other functions, states or conditions of operation.

The time between powering up said fan of the condenser and said motor-compressor is advantageously in the order of 30 seconds, and the time between starting said motor-compressor and its operation under normal conditions is in the order of 20 seconds.

The sequence (reference numeral 1 in the figure) is therefore as follows:

at To, power up the condenser fan, at To+30s, power up the compressor motor in the start-up phase (low speed N=1 200 rpm), at To+50s, set compressor operating conditions as a function of the cooling requirement of the installation.

The above sequence limits the peak current on start-up and guarantees at all times a ratio $Id/In \leq 2$, where Id is the start-up current and In is the nominal current consumption (reference numeral 2 in the figure).

During the start-up phase, operation of the motor-compressor at a low speed (block 3) is tolerated in order to reduce the power consumption to a value less than 12 kVA, for example (if it is a question of the maximum power that the auxiliary power unit can supply), subject to a cooling power less than the nominal power (block 4).

It should be noted here that in conventional installations the ratio Id/In is in the order of 5 or more.

In accordance with another feature of the invention, the mode of operation of the installation is further characterised in that if the main onboard alternator is stopped, the helicopter being on the ground, said motor-compressor is automatically connected to said auxiliary power unit, operation of which is reflected in the transmission to said inverter of a signal causing it to maintain reduced operating conditions of said motor-compressor in order not to exceed the maximum power permitted during operation from said auxiliary power unit (12 kVA according to the above hypothesis).

This function is represented by block 4 in the figure.

The "discrete APU" block 5 means that information is transmitted to the inverter (constituting the regulation brain) indicating that the auxiliary power unit is active. The inverter then imposes reduced operating conditions of the motor-compressor (block 3) in order not to exceed the authorised maximum power, i.e. the 12 kVA mentioned above. This obtains maximum efficiency from the invention as a function of the maximum power permitted.

Alternatively, when the helicopter is parked on a stand with the rotor stopped, it is conceivable for standby air-conditioning to be obtained by connecting the motor-compressor to a power outlet of the stand, using the power available from that outlet, of course. Operation from a power outlet of a stand is effective provided that sufficient power is supplied by this type of power supply. If not, the system trips out.

The invention has other features allowing for the widely varying air temperatures that may be encountered at the condenser inlet.

The mode of operation of the installation is therefore characterised in that if the main onboard alternator is operating, the helicopter being in flight, said motor-compressor is automatically connected to the alternator and its operating conditions are the nominal conditions and are controlled by the inverter in proportional to $\Delta T$ if the condenser air inlet temperature Tcd is substantially in the range from 17° C. to 50° C., $\Delta T$ being the difference between a set point temperature Tc set manually and the ambient temperature Ta in said cockpit or cabin measured by a sensor located in air recirculation intakes.

Blocks 6 to 8 of the block diagram show operation under nominal conditions; the cooling power is equal to the nominal power (block 9).

In this case, $\Delta t = Tc - Ta$ is measured continuously, the ideal being to obtain $\Delta T = 0$.

If $\Delta T$ is not equal to zero, the corresponding value is transformed into a voltage variation transmitted to the inverter which varies the operating conditions of the motor-compressor; this regulates the operation of the installation. According to the information supplied by the inverter, the operating conditions of the motor-compressor are then sufficient to supply the cooling power needed to obtain a minimum $\Delta T$: the nominal power corresponding to the nominal conditions is therefore obtained; in this case, the permitted maximum consumption is never exceeded. The particular feature of the operation of the motor-compressor is therefore that the operating conditions, i.e. the cooling power injected into the cabin or cockpit, vary in accordance with information transmitted by the inverter so that exactly what is required is supplied. The operating conditions are varied automatically immediately the temperature inside the helicopter changes, and the thermal balance therefore varies (because a window is more exposed to the sun, for example).

Another mode of operation is characterised in that if the main onboard alternator is operating, the helicopter being in flight, said motor-compressor is automatically connected to the alternator and its operating conditions are controlled by the inverter so that reduced operating conditions apply if the condenser air inlet temperature Tcd is substantially in the range from 50° C. to 60° C.

Blocks 3, 4 and 10 of the block diagram illustrate such reduced operating conditions.

If the air temperature at the condenser inlet exceeds 60° C., physical limitations are encountered due to the coolant gas, for example freon, which loses its properties and is therefore unable to provide the required cooling when the temperature is above 60° C.

In this case, the mode of operation of the installation is therefore characterised in that if the main onboard alternator is operating, the helicopter being in flight, said motor-compressor is automatically connected to the alternator and its operating conditions are controlled by the inverter so that it is stopped if the condenser air inlet temperature Tcd is substantially in the range from 60° C. to 75° C. and automatically restarted if the condenser air inlet temperature Tcd is substantially less than 60° C.

Blocks 11 and 12 of the block diagram illustrate intermittent operation under such conditions. In this mode there is no longer any regulation and the cooling system is turned off. It restarts as soon as the extreme temperature conditions no longer apply. These conditions correspond to situations mainly encountered when hovering: at such times there is no longer any dynamic effect due to the speed of the helicopter to reduce the temperature at the air inlets of the condenser. The dominant effect is then recirculation of the exhaust gasses, leading to a rapid rise in temperature. Such flight conditions generally do not apply for long, and air-conditioning resumes in any event when Tcd falls below 60° C. In the range of temperatures from 60° C. to 75° C., stopping and restarting are automatic, requiring no action by the crew: the motor-compressor stops if Tcd>60° C. and restarts as soon as Tcd<60° C. provided that Tcd has not exceeded 75° C.

In exceptional cases Tcd>75° C. which can cause very high pressures in the cooling circuit.

The mode of operation of the installation is then characterised in that if the main onboard alternator is operating, the helicopter being in flight, said motor-compressor is automatically connected to the alternator and its operating conditions are controlled by the inverter so that it is stopped if the condenser air inlet temperature Tcd is substantially greater than 75° C. and must be restarted manually.

Blocks 13 and 14 of the block diagram illustrate this mode of operation.

The start-up phase described above (blocks 1 to 3) is repeated on manual restarting by the crew.

Clearly the same helicopter could have more than one air-conditioning installation, for example one for the cockpit and one for the cabin, operating independently and in accordance with any of the modes of operation defined above, the mode of operation in flight depending to a large extent on the location of the condensers. The motor-compressor/condenser units can be installed in multipurpose fins (large fins) for example, with the condenser air inlets on the underside of the fin: this configuration is relatively insensitive to recirculation of air from the exhaust. The increase in the temperature of the air at the condenser inlet relative to the outside air temperature is then the order of 7° C. to 8° C.

These units can also be mounted in smaller fins: the condenser air inlet is then at the front of the fin, which greatly increases sensitivity to recirculation. In this case, the temperature can be increased 18° C. to 20° C. relative to the outside air temperature.

What is claimed is:

1. A mode of operation of an air-conditioning installation of a helicopter cabin or cockpit, the helicopter being equipped with an auxiliary power unit adapted to deliver additional electrical power less than the electrical power of the main onboard alternator, which installation is of the type using cyclic compression and expansion of a coolant fluid and includes, by way of a external high-pressure unit, a storage tank for said fluid, and a motor-compressor powered by an electrical control system including a controller and an inverter for controlling the motor-compressor, the motor-compressor being associated with a condenser equipped with a fan and, by way of an internal low-pressure unit, an evaporator associated with an expansion unit, with air inlets and outlets communicating with said cabin or cockpit, which mode of operation is characterised in that it includes a start-up sequence controlled by said inverter during which the fan of the condenser is first powered up, after which the motor-compressor is powered up to start it at a low speed, after which the motor-compressor is operated under its normal conditions and as a function of the cooling requirements of the installation.

2. A mode of operation according to claim 1 characterised in that the time between powering up said fan of the condenser and said motor-compressor is in the order of 30 seconds.

3. A mode of operation according to claim 1, characterised in that the time between starting said motor-compressor and its operation under normal conditions is in the order of 20 seconds.

4. A mode of operation according to any one of claims 1 to 3 characterised in that if the main onboard alternator is stopped, the helicopter being on the ground, said motor-compressor is automatically connected to said auxiliary power unit, operation of which is reflected in the transmission to said inverter of a signal causing it to maintain reduced operating conditions of said motor-compressor in order not to exceed the maximum power permitted during operation from said auxiliary power unit.

5. A mode of operation according to any one of claims 1 to 3 characterised in that if the main onboard alternator is stopped, the helicopter being on the ground, said motor-compressor is connected to a stand power outlet.

6. A mode of operation according to any one of claims 1 to 3 characterised in that if the main onboard alternator is operating, the helicopter being in flight, said motor-compressor is automatically connected to the alternator and its operating conditions are the nominal conditions and are controlled by the inverter in proportion to $\Delta T$ if the condenser air inlet temperature Tcd is substantially in the range from 17° C. to 50° C., $\Delta T$ being the difference between a set point temperature Tc set manually and the ambient temperature Ta in said cockpit or cabin measured by a sensor located in air recirculation intakes.

7. A mode of operation according to any one of claims 1 to 3 characterised in that if the main onboard alternator is operating, the helicopter being in flight, said motor-compressor is automatically connected to the alternator and its operating conditions are controlled by the inverter so that reduced operating conditions apply if the condenser air inlet temperature Tcd is substantially in the range from 50° C. to 60° C.

8. A mode of operation according to any one of claims 1 to 3 characterised in that if the main onboard alternator is operating, the helicopter being in flight, said motor-compressor is automatically connected to the alternator and its operating conditions are controlled by the inverter so that it is stopped if the condenser air inlet temperature Tcd is substantially in the range from 60° C. to 75° C. and automatically restarted if the condenser air inlet temperature Tcd is substantially less than 60° C.

9. A mode of operation according to any one of claims 1 to 3 characterised in that if the main onboard alternator is operating, the helicopter being in flight, said motor-compressor is automatically connected to the alternator and its operating conditions are controlled by the inverter so that it is stopped if the condenser air inlet temperature Tcd is substantially greater than 75° C. and must be restarted manually.

* * * * *